(12) United States Patent
Cheng et al.

(10) Patent No.: US 10,094,482 B2
(45) Date of Patent: Oct. 9, 2018

(54) MONOFLANGE VALVE

(71) Applicant: Parker-Hannifin Corporation, Cleveland, OH (US)

(72) Inventors: Mike Kong Cheng, Sugar Land, TX (US); Xiaopeng Sun, Calgary (CA)

(73) Assignee: Parker-Hannifin Corporation, Cleveland, OH (US)

( * ) Notice: Subject to any disclaimer, the term of this patent is extended or adjusted under 35 U.S.C. 154(b) by 26 days.

(21) Appl. No.: 15/283,704

(22) Filed: Oct. 3, 2016

(65) Prior Publication Data

US 2017/0097101 A1 Apr. 6, 2017

Related U.S. Application Data

(60) Provisional application No. 62/237,902, filed on Oct. 6, 2015.

(51) Int. Cl.
*F16K 11/20* (2006.01)
*F16K 17/02* (2006.01)
*F16K 11/22* (2006.01)
*F16K 17/04* (2006.01)

(52) U.S. Cl.
CPC ............. *F16K 11/20* (2013.01); *F16K 11/22* (2013.01); *F16K 17/02* (2013.01); *F16K 17/0473* (2013.01); *Y10T 137/87917* (2015.04)

(58) Field of Classification Search
CPC ... Y10T 137/87917; F16K 11/20; F16K 17/02
See application file for complete search history.

(56) References Cited

U.S. PATENT DOCUMENTS 6,293,518 B1 * 9/2001 Illy et al. .................. F16K 1/08
251/318
7,255,329 B1 * 8/2007 Sedens et al. .......... F16K 3/314
251/327

FOREIGN PATENT DOCUMENTS

WO 2013/112731 8/2013

* cited by examiner

*Primary Examiner* — Kevin Lee
(74) *Attorney, Agent, or Firm* — Renner, Otto, Boisselle & Sklar, LLP

(57) ABSTRACT

A monoflange valve including a valve body having an inlet, an outlet, and an internal bore, and a valve assembly having a valve member disposed in the internal bore for cooperating with a valve seat to open or close a flow path through the valve body. The valve seat may be disposed in the internal bore at a central region of the monoflange body proximal the inlet for enhancing fluid flow through the monoflange body. One or more valve assemblies may be provided, each having a corresponding valve seat that may be located at the central region proximal the inlet passage. One or more projections may extend radially outwardly from the valve body, and the valve assemblies may have a sealing member welded to the corresponding projection at a location spaced radially outwardly from the valve body for facilitating welding and/or inspection of the weldment.

20 Claims, 12 Drawing Sheets

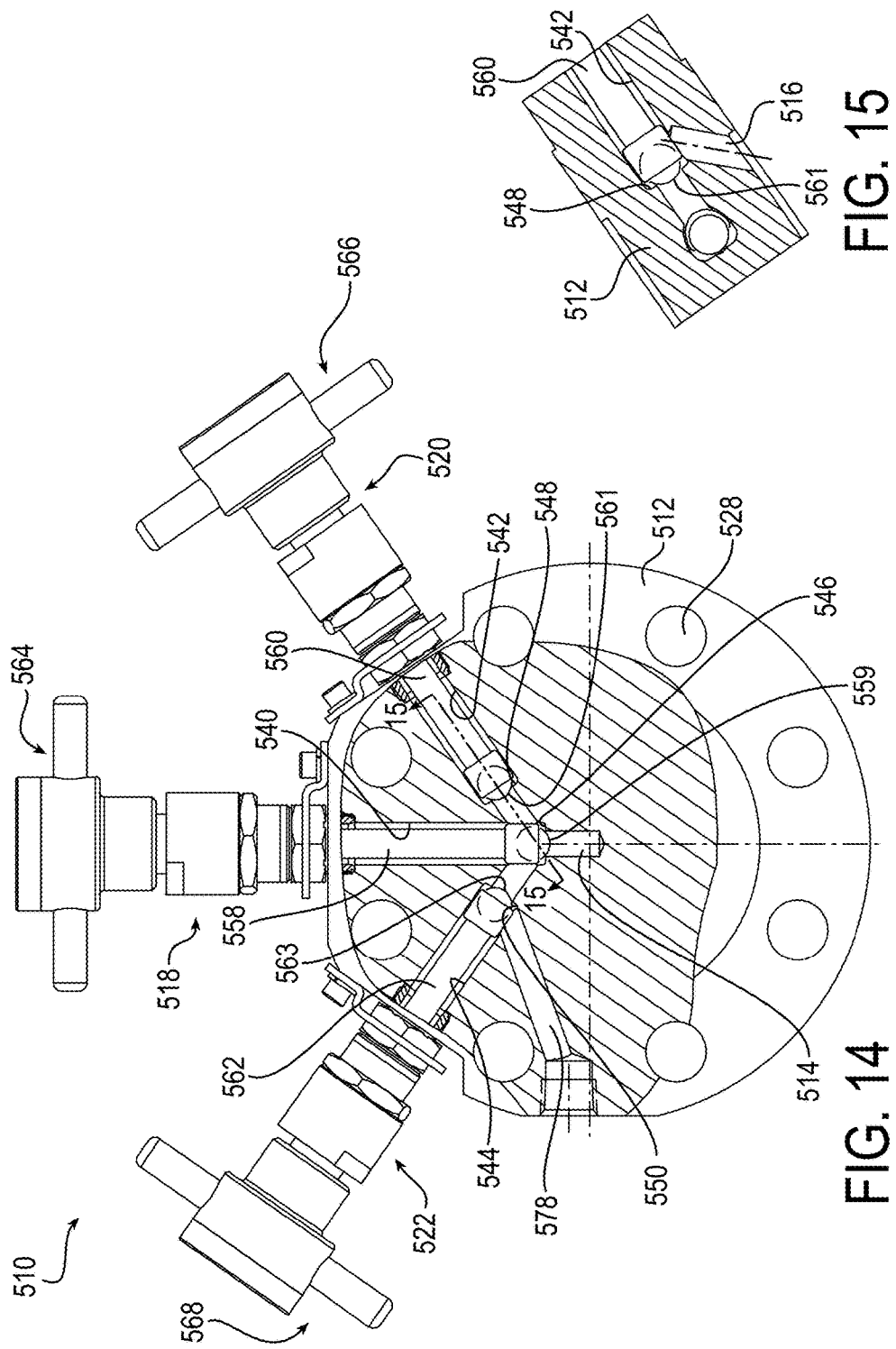

MONOFLANGE VALVE

RELATED APPLICATIONS

This application claims the benefit of U.S. Provisional Application No. 62/237,902 filed Oct. 6, 2015, which is hereby incorporated herein by reference in its entirety.

FIELD OF INVENTION

The present invention relates generally to a monoflange valve, and more particularly to a monoflange valve assembly for use with processing fluids including severe service media.

BACKGROUND

Monoflange valves are typically used for pressure instrumentation take-off points, isolation, sampling, injection, venting, or purging of processing fluids. These monoflange valves typically have a valve body with a flange interface for mounting directly onto a flanged connection located upstream or downstream of processing equipment. Known monoflange valves typically have an axial inlet passage and an outlet passage for communicating the processing fluid from a main fluid conduit to a pressure gauge or other instrumentation. In addition, known monoflange valves typically include two or more valve assemblies and corresponding valve seats disposed within the valve body between the inlet passage and outlet passage for blocking fluid flow and isolating such instrumentation, or for venting fluid from the valve body.

Providing multiple valve assemblies within the same monoflange valve body enables a relatively compact design, and therefore such monoflange valves are typically used as an alternative to multi-valve systems that require separate flange adapters. The more compact monoflange valve design also reduces the number of potential fluid leakage paths compared to multi-valve designs, which is useful when such monoflange valves are used in severe service media applications. When used in severe service applications, the valve assemblies disposed within the monoflange valve body are often sealingly attached to the monoflange valve body via welding for preventing the severe service media from leaking out of the valve body. To ensure zero defect and leakage from the welds, the welding interfaces may require 100% weld penetration and 100% radiographic inspection.

SUMMARY OF INVENTION

Known monoflange valves of the type described above typically have a configuration in which the valve assemblies are welded at locations that are too close to the valve body to allow for automatic weldment processes to generate consistent and stable welds. The placement of such welded joint connections close to the valve body also limits the space available for radiographic examination of the weld. Known monoflange valve designs also typically locate the valve seats that cooperate with the valve assemblies close to the outer periphery of the valve body, which increases the length and tortuosity of the flow path through the valve body. This reduces the fluid flow characteristics of known monoflange designs, and potentially causes the processing fluids to clog in the valve body.

According to one aspect, the present invention provides a monoflange valve assembly having at least one centrally located valve seat that cooperates with at least one valve member to open or close a fluid flow path through the valve body. More particularly, the centrally located valve seat may be located close to an axial inlet passage to reduce the length and tortuosity of the flow path through the valve body, which may enhance fluid flow through the valve body.

In exemplary embodiments, more than one valve seat may be centrally located in the valve body for cooperating with respective valve members. The plurality of valve seats may be annularly arranged around the periphery of a common internal seat pocket chamber to define respective sides of the internal seat pocket chamber. The internal seat pocket chamber may be fluidly connected to the axial inlet passage, and the valve seats defining the respective sides of the internal seat pocket chamber all may be disposed proximally to the axial inlet passage, which may be disposed at a central region of the monoflange valve body.

According to another aspect, the present invention provides a monoflange valve assembly having a main monoflange body with one or more projections extending radially outwardly from the main body. One or more valve assemblies may be welded to the respective projections at locations spaced radially outwardly from the main valve body. Locating the weldment of the valve assemblies to the projections away from the valve body in this way may facilitate welding and/or inspection of the weldment at the attachment interface. More particularly, such a configuration may provide sufficient spacing for automatic weldment processes to generate a consistent and stable weld (e.g., 100% full weld penetration), as well as enable sufficient spacing from the main monoflange body for improved visual and/or radiographic inspection of the weld (e.g., 100% inspection of the weld area).

In exemplary embodiments, the one or more valve assemblies that are welded to the respective projections may include one or more sealing members, such as a bellows and a bonnet. The one or more sealing members may be respectively sealingly attached to each other, to other parts of the valve assembly, and to the valve body projection so as to reduce or eliminate leakage of the processing fluid out of the valve body.

According to an aspect of the invention, a monoflange valve assembly includes a monoflange body having an axial inlet fluid passage disposed in a central region of the monoflange body, an outlet fluid passage fluidly connected to the axial inlet fluid passage, and an internal bore extending radially inwardly from a radially outer periphery of the monoflange body to a valve seat; and a valve assembly having a valve member disposed in the internal bore, the valve member having a sealing surface for engaging the valve seat; wherein the valve member is movable in the internal bore between a closed position in which the sealing surface engages the valve seat to close a flow path between the inlet fluid passage and the outlet fluid passage, and an open position in which the sealing surface disengages from the valve seat to open the flow path between the inlet fluid passage and the outlet fluid passage; and wherein the valve seat is disposed at the central region of the monoflange body between the inlet fluid passage and the outlet fluid passage to enhance fluid flow through the monoflange body.

According to another aspect of the invention, a monoflange valve assembly includes a monoflange body having an axial inlet fluid passage, an outlet fluid passage fluidly connected to the axial inlet fluid passage, and a plurality of internal bores each extending radially inwardly from a radially outward periphery of the monoflange body; and a plurality of valve assemblies each having a valve member disposed in the respective internal bores, the respective valve members each have a sealing surface configured to cooperate with corresponding valve seats disposed at radially inward end portions of the respective internal bores; wherein the valve seats are annularly arranged around a periphery of a common internal seat pocket chamber and define respective sides of the internal seat pocket pocket chamber.

According to another aspect of the invention, a monoflange valve assembly includes a monoflange body having a main body portion, the main body portion having an axial fluid passage for communication with a fluid stream; a projection extending radially outwardly from the main body portion, the projection having an internal bore that extends radially inwardly through the projection and connects with the axial fluid passage of the main body portion; and a valve assembly having an attachment body welded to the projection at a location spaced radially outwardly from the main body portion, thereby facilitating welding and/or inspection of the weldment.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 14 is a cross-sectional view of another exemplary monoflange valve assembly according to an embodiment of the invention.

FIG. 15 is a side cross-sectional view of the monoflange valve assembly taken along the line 15-15 in FIG. 14.

DETAILED DESCRIPTION

The principles of the present invention have particular application to monoflange valve assemblies for use with severe service media, such as Phosgene ($COCl_2$), Chlorine (Cl), Anhydrous Ammonia ($NH_3$), Cyanide (CN), and/or other severe media, including those from Category M of ASME B31.3, and thus will be described below chiefly in this context. It is also understood, however, that principles of this invention may be applicable for use in other applications, including non-severe media applications, where it is desirable to enhance fluid flow characteristics during use, or to facilitate welding and/or inspection of the monoflange valve assembly before use in such applications.

Figure 1:
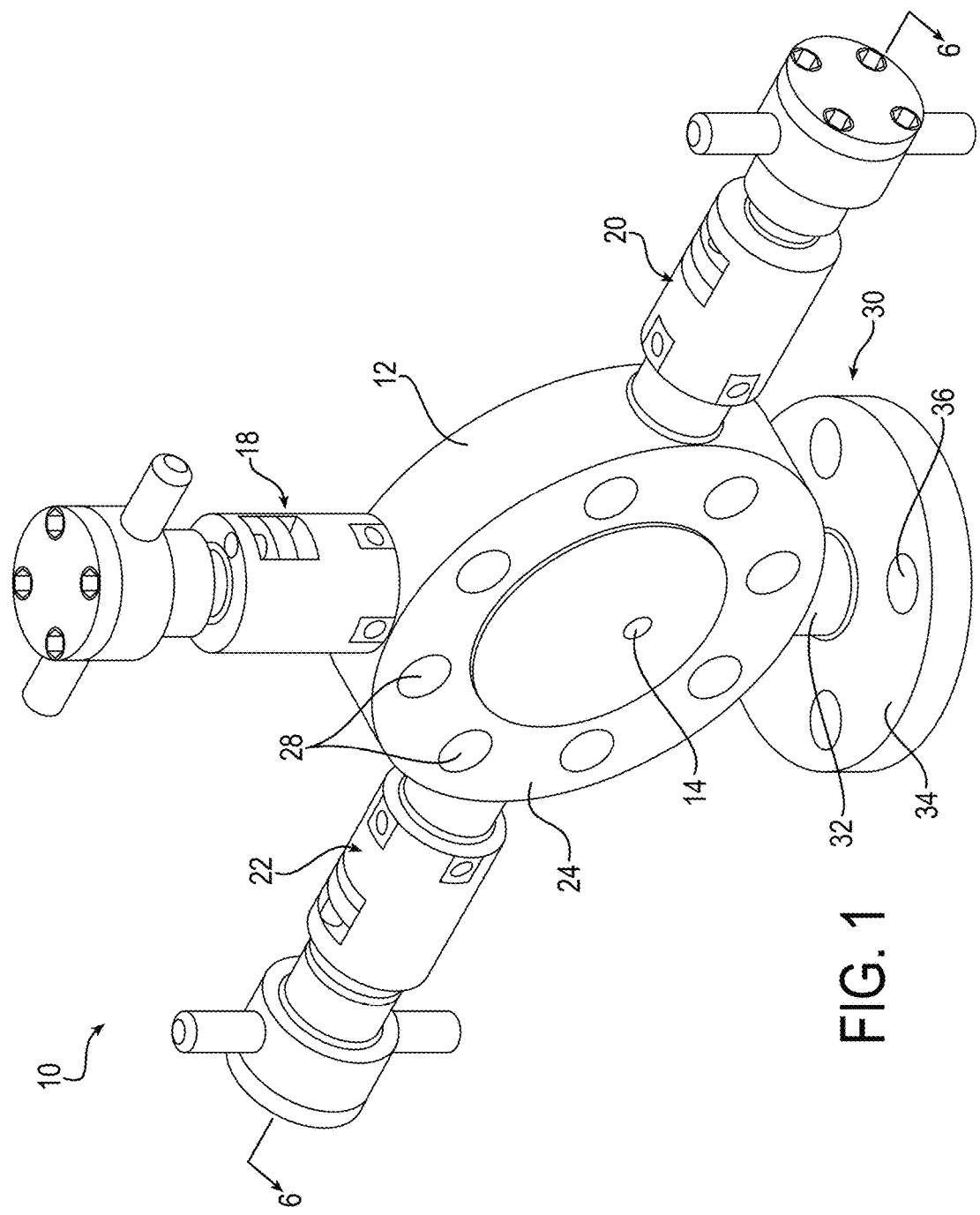
FIG. 1 is a front perspective view of an exemplary monoflange valve assembly according to an embodiment of the invention.
Figure 2:
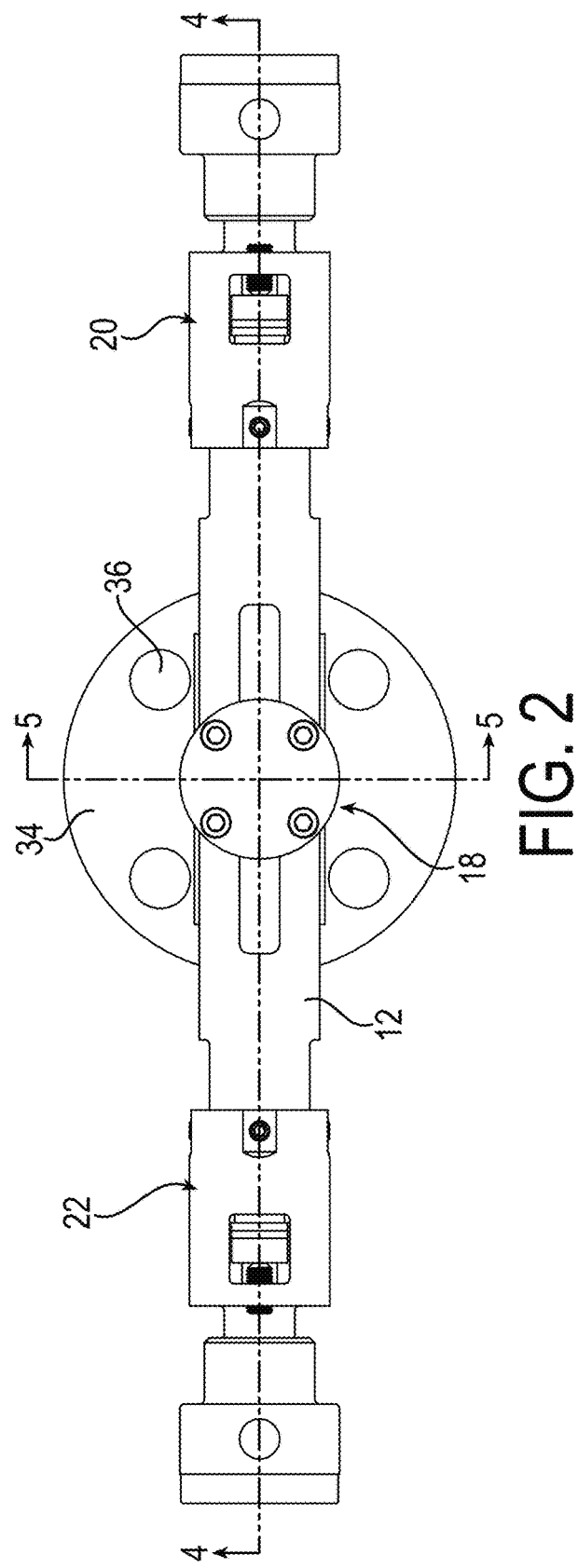
FIG. 2 is a top view of the monoflange valve assembly in FIG. 1.
Figure 3:
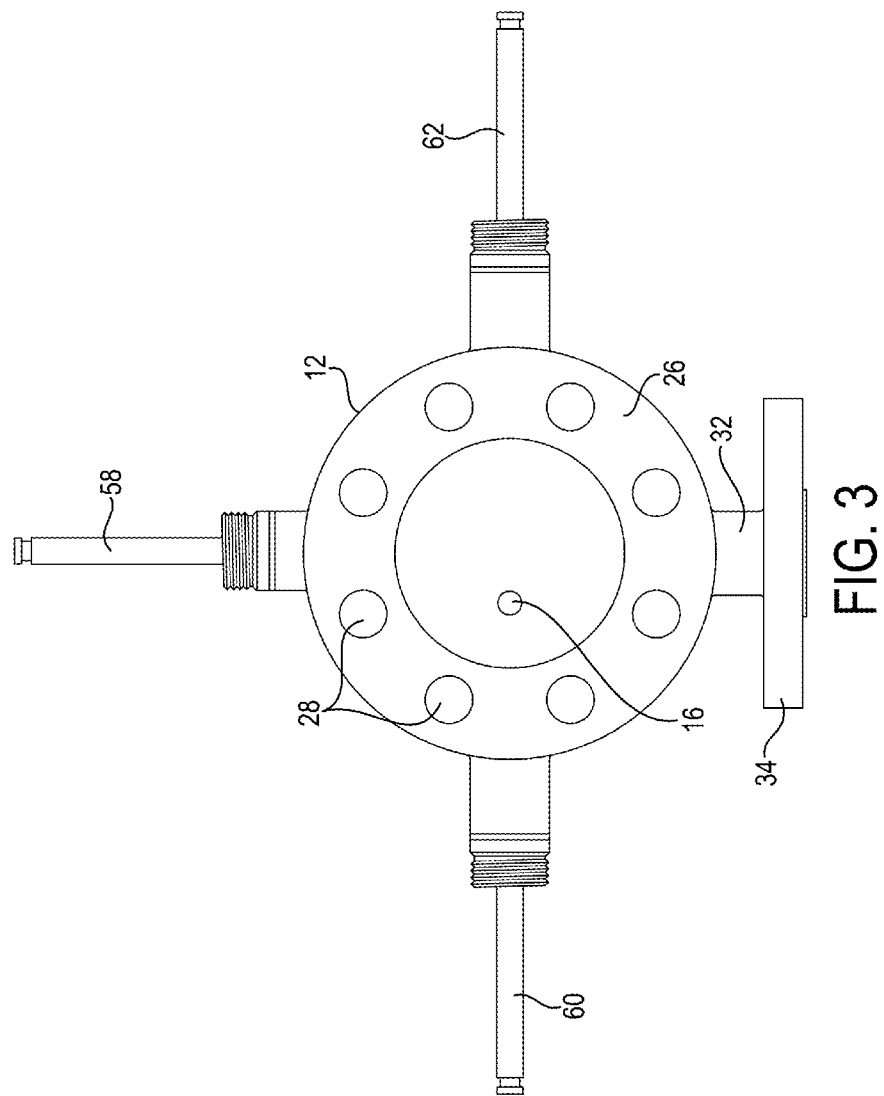
FIG. 3 is a rear view of the monoflange valve assembly in FIG. 1 shown with actuators removed.

Turning to FIGS. 1-3, an exemplary monoflange valve assembly 10 is shown. The monoflange valve assembly 10 includes a main body portion 12 having an axial inlet fluid passage 14 (shown in FIG. 1), an outlet fluid passage 16 (shown in FIG. 3), and one or more valve assemblies 18, 20, 22 for enabling or restricting fluid flow from the inlet fluid passage 14 to the outlet fluid passage 16.

The main body portion 12 (also referred to as the valve body 12) may have opposite faces 24, 26 configured to interface directly onto a horizontal or vertical flanged connection that stems off of a main fluid conduit line in a processing stream, which may be upstream or downstream of certain processing equipment (not shown). In such applications, the inlet fluid passage 14 may be in fluid communication with the main fluid conduit, and the valve body 12 may communicate fluid flow via a fluid flow path to the outlet passage 16. The outlet passage 16 may be in fluid communication with a pressure gauge, transmitter, or other instrumentation for sampling, injecting, isolating, etc. the processing fluid.

The main body portion 12 also may include bolt holes 28 disposed in an annular pattern around the face 24 of the valve body 12 for fastening the monoflange valve body to corresponding flange connection(s), which may include all standard ANSI classes flange connections. It is understood that although the monoflange valve body 12 is shown as a generally disc-shaped body, the valve body 12 may be made into different geometries to accept different flange-style connections as demanded by the specific application, which may include different shapes of the valve body 12 including round, rectangular, square, polygonal, or other similar shapes.

In exemplary embodiments, the monoflange valve body 12 may be a unitary member that may be formed from a unitary metal casting. In the illustrated embodiment, the monoflange valve assembly 10 also includes a flange member 30 having a neck 32 extending radially outwardly from the valve body 12, and a flange 34 disposed at a radially outer portion of the neck 32. The neck 32 may be integral and unitary with the main body portion 12. The flange 34 may have bolt holes 36, and may be configured to interface with a corresponding flange connection, which may be configured to a standard ANSI flange connection. As discussed in further detail below, the flange member 30 may have a bleed passage or vent passage for enabling fluid flow to be vented or bled from the monoflange valve body 12.

Turning to FIGS. 4-7, cross-sectional views of the exemplary monoflange valve assembly 10 are shown. In the illustrated embodiment, the valve body 12 has internal bores 40, 42, 44 extending radially inwardly from a radially outer periphery of the valve body 12 to respective valve seats 46, 48, 50, which may be defined by the valve body or installed in the valve body 12. The valve assemblies 18, 20, 22 each have a valve member 52, 54, 56 disposed within the respective internal bores 40, 42, 44. The valve members 52, 54, 56 may include a valve stem 58, 60, 62 and a sealing surface 59, 61, 63 for engaging the respective valve seats 46, 48, 50. Each valve stem 58, 60, 62 may be operably coupled to an actuator 64, 66, 68 for moving the valve stem 58, 60, 62 and sealing surface 59, 61, 63 toward and away from the respective valve seats 46, 48, 50. In this manner, each valve member 52, 54, 56 is movable in the internal bore 40, 42, 44 between a closed position in which the sealing surface 59, 61, 62 engages the valve seat 46, 48, 50 to close a fluid flow path across the valve seat, and an open position in which the sealing surface 59, 61, 62 disengages from the valve seat 46, 48, 50 to open a flow path across the valve seat.

Figure 4:
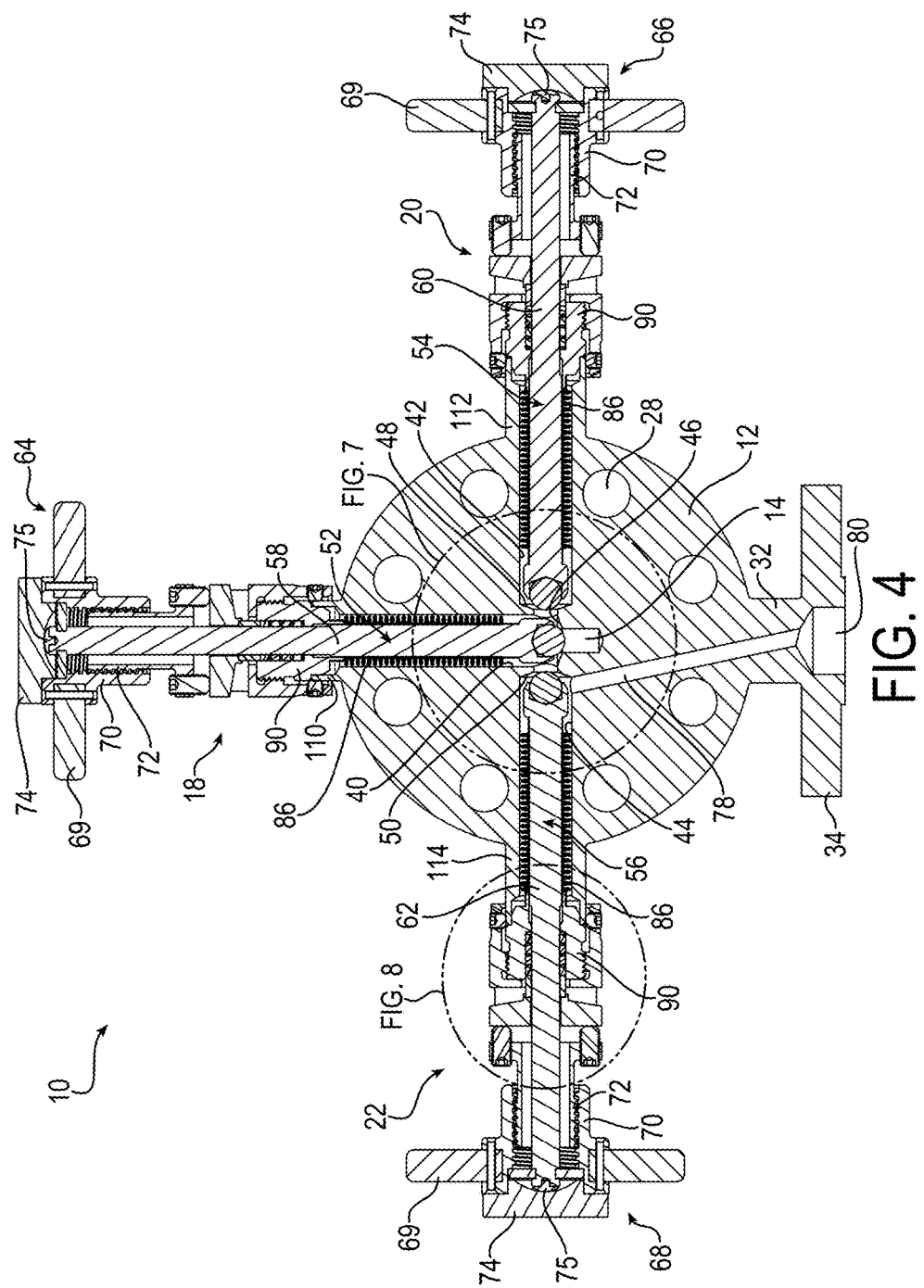
FIG. 4 is a front cross-sectional view of the monoflange valve assembly taken along the line 4-4 in FIG. 2.
Figure 5:
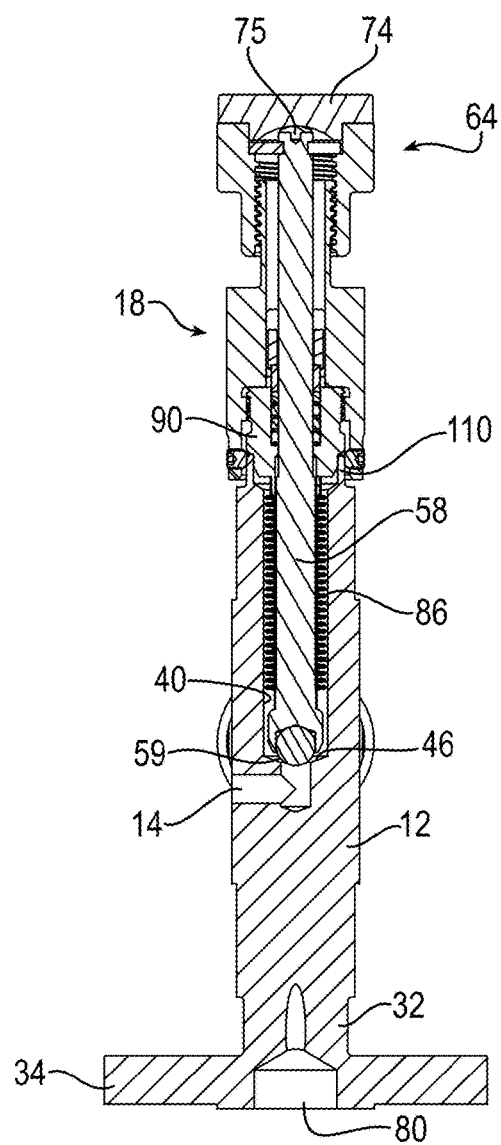
FIG. 5 is a side cross-sectional view of the monoflange valve assembly taken along the line 5-5 in FIG. 2.
Figure 6:
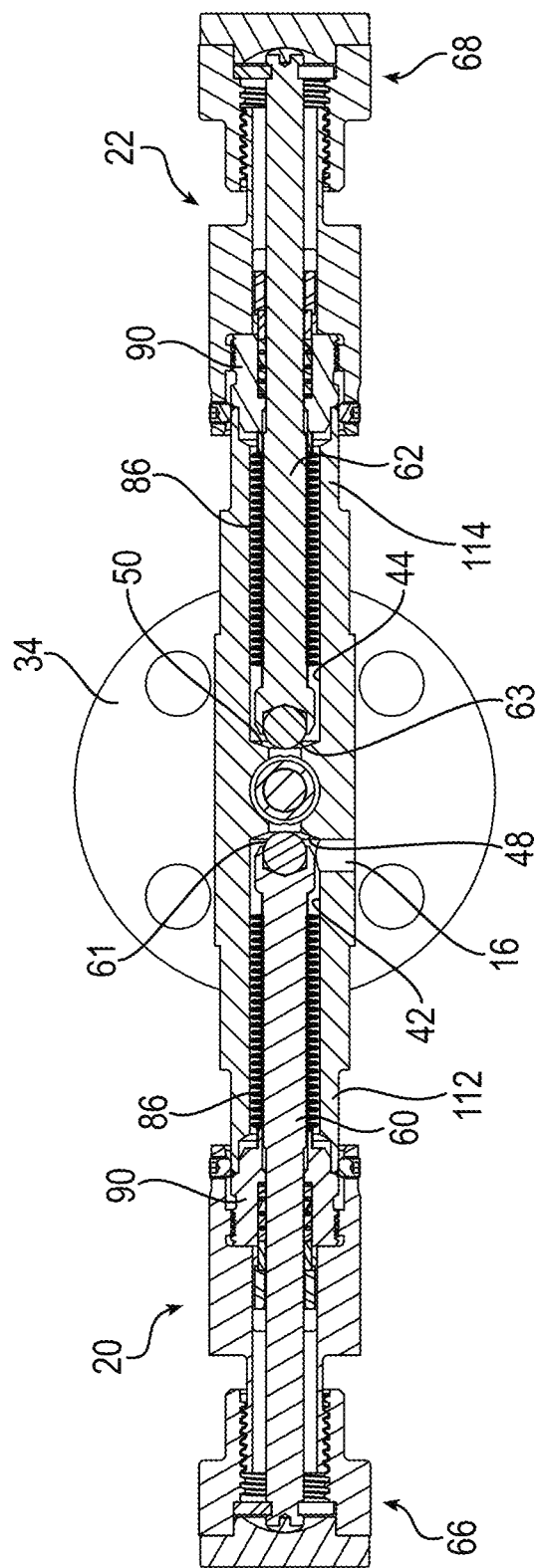
FIG. 6 is a top cross-sectional view of the monoflange valve assembly taken along the line 6-6 in FIG. 1.

For example, as shown in FIG. 4, the first valve assembly 18 has first valve stem 58 and first sealing surface 59 configured to engage first valve seat 46 disposed at a radially inward portion of the internal bore 40. The valve stem 58 may be configured to hold the sealing surface 59, such as a ball, and carries the sealing surface 59 toward and away from the valve seat 46 as the valve stem 58 is moved radially with respect to the valve body 12 in the internal bore 40. As shown, the valve seat 46 is disposed in the valve body 12 between the axial inlet passage 14 and the outlet passage 16 for blocking or allowing fluid flow through the monoflange valve body 12.

The actuator 64 is operably coupled to a radially outer portion of the valve stem 58 and may be operable to move the valve stem 58 radially inwardly or outwardly relative to the valve body 12. In the illustrated embodiment, the actuator 64 includes a handle 69 coupled to a nut 70 having an internal thread for threadably receiving corresponding outer threads on an upper collar 72 that is operably coupled to the valve body 12. The actuator 64 also may include a cap 74 and a thrust button 75. As the handle 69 is rotated on the threads inwardly toward the valve body 12 or outwardly away from the valve body 12, the thrust button 75 imparts force to move the valve stem 58 radially inwardly or outwardly in the internal bore 40 without rotating the valve stem 58 in the bore. Such a configuration enables non-rotating, linear motion of the valve stem 58 which may provide smoother operation for seating or unseating the valve member 52, and may also facilitate life-cycle testing of the valve assembly with a simple linear actuator testing device.

The second valve assembly 20 may be substantially similar to the first valve assembly 18, and consequently the same reference numerals are used to refer to the same or similar structures, except where noted. The second valve assembly 20 has second valve stem 60 and second sealing surface 61 configured to engage second valve seat 48 disposed at a radially inward portion of the internal bore 42. The second valve seat 48 is disposed in the valve body 12 between the axial inlet passage 14 and the outlet passage 16 for blocking or allowing fluid flow through the monoflange valve body 12. The second valve seat 48 is located downstream of the first valve seat 46, and the valve body 12 may have an intermediate passage 76 fluidly connected between the first valve seat 46 and the second valve seat 48. In this manner, the second valve assembly 20 cooperating with the second valve seat 48 may provide a secondary block (or backup) to the first valve assembly 18 (or primary block) for blocking fluid flow through the valve body 12.

The third valve assembly 22 may be substantially similar to the first valve assembly 18 or the second valve assembly 20, and consequently the same reference numerals are used to refer to the same or similar structures, except where noted. The third valve assembly 22 has third valve stem 62 and third sealing surface 63 configured to engage third valve seat 50 disposed at a radially inward portion of the internal bore 44. The third valve seat 50 is disposed in the valve body 12 between the axial inlet passage 14 and a bleed fluid passage 78. The third valve seat 50 is located downstream of the first valve seat 46, and the valve body 12 may have a second intermediate passage 79 fluidly connected between the first valve seat 46 and the third valve seat 50. In this manner, the third valve assembly 22 (or bleed valve) may block or allow fluid flow to the bleed passage 78 for enabling fluid to be bled or vented from the monoflange valve body 12. The bleed fluid passage 78 may be fluidly connected to a bleed outlet 80, and the flange member 30 may include at least a portion of the bleed fluid passage 78 and the bleed outlet 80.

It is understood that the although the exemplary monoflange valve assembly 10 is shown in a double-block and bleed configuration, other configurations of the monoflange valve assembly 10 may be employed. For example, the monoflange valve assembly may be configured as a single-block valve in which only the first valve assembly 18 cooperating with the first valve seat 46 is provided. Other configurations of the exemplary monoflange valve assembly include block and bleed, three-block and bleed, five-block and bleed and others. In addition, although the exemplary monoflange valve assembly 10 is shown having sealing surface 59, 61, 63 configured as a ball, other types of sealing surfaces and corresponding valve seats may be employed, including for example cone, swivel, wafer, hard seat and soft seat style sealing configurations. It is further understood that although the internal bores 40, 42, 44 and various fluid passages 14, 16, 76, 78, 79 in the monoflange valve body 12 are shown as straight paths with cylindrical cross-sections, other configurations may be employed, including for example polygonal cross-sections or non-linear paths, which may be made or formed by casting, machining, or other such techniques known in the art.

Figure 7:
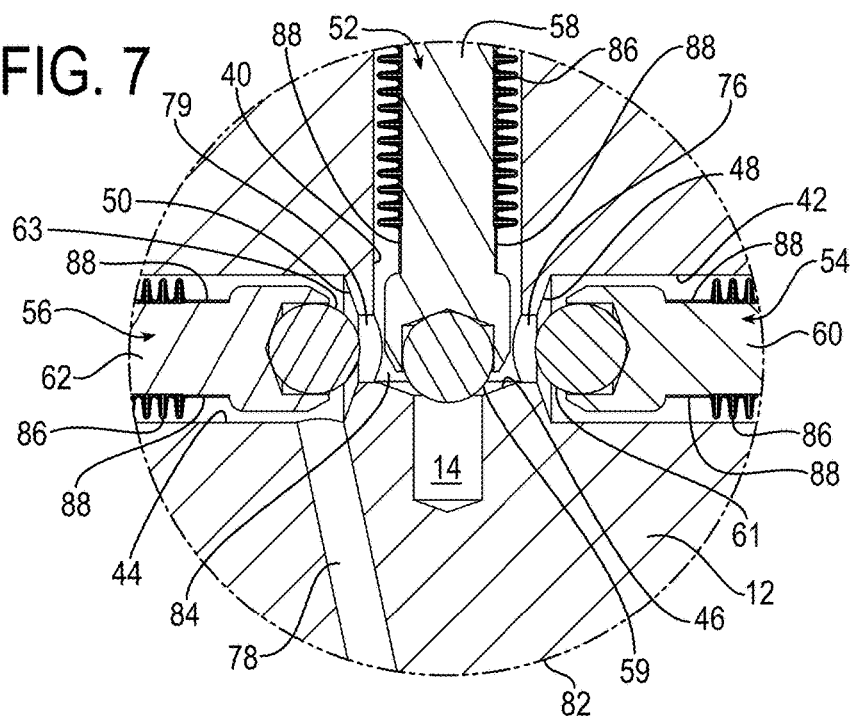
FIG. 7 is an enlarged view of a central region of the monoflange valve assembly in FIG. 4.

As shown in FIG. 7, the valve seat 46 that cooperates with the first valve member 52 may be located at a central region 82 of the main monoflange body 12. More particularly, the valve seat 46 may be located proximal or adjacent to the inlet passage 14 which is disposed at the central region 82 of the valve body 12. As used herein, the term "central region" refers to the region 82 of the valve body 12 that is located radially inwardly of an imaginary annulus defined by radially inner sides of the bolt holes 18, and both the inlet passage 14 and valve seat 46 may be located in this central region 82. In exemplary embodiments, both the inlet passage 14 and the valve seat 46 may be located closer to the center of the valve body 12 in cross-section than to the radially outer periphery of the valve body 12, as shown. By locating the valve seat 46 at the central region 82 between the centrally located inlet passage 14 and the outlet passage 16, the axial flow path through the valve body 12 may be shortened and fluid flow characteristics through the valve body may be enhanced. The shorter flow path provided by such a configuration also may reduce the tendency of certain processing fluids (e.g., phosgene) to clog in the valve body 12, which otherwise could reduce flow performance. In addition, by locating the valve seat 46 at the central region 82 of the valve body 12, sufficient thickness around the valve seat 46 may be provided so as to enable the valve body 12 to withstand higher operating pressures.

Also as shown in the illustrated embodiment, the second valve seat 48 and/or the third valve seat 50 may be located at the central region 82 of the valve body 12. More particularly, the second valve seat 48 and/or the third valve seat 50 may be located closer to the center of the valve body 12 than the outer periphery of the valve body 12, or may be located proximally to the centrally located inlet passage 14.

In exemplary embodiments, the respective valve seats 46, 48, 50 may be annularly arranged around a periphery of a common internal seat pocket chamber 84 to define respective sides of the internal seat pocket chamber 84. In this manner, the respective valve seats 46, 48, 50 all may be centrally located proximally to the centrally located inlet passage 14 so as to shorten the flow paths and enhance fluid flow characteristics. For example, locating the second valve seat 50 at the central region downstream of the first valve seat 48 and upstream of the outlet passage 16 may enable a shorter flow path and enhance fluid flow from the inlet passage 14 to the outlet passage 16. Similarly, locating the third valve seat 52 at the central region downstream of the first valve seat 48 and upstream of the bleed passage 78 also may enable improved flow over prior art monoflange valve designs.

Figure 9:
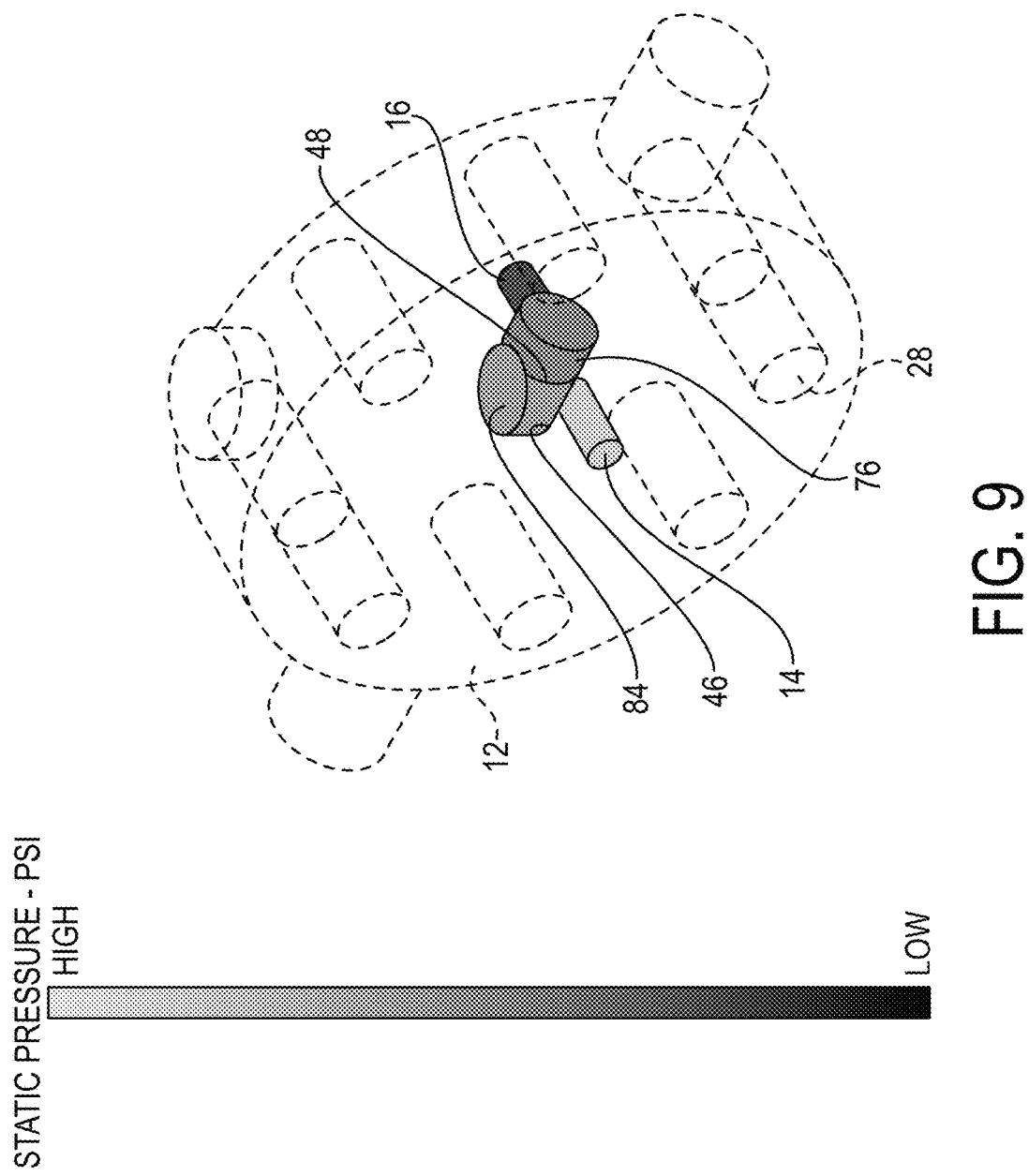
FIG. 9 is an exemplary computational fluid dynamic simulation of fluid flow characteristics through the exemplary monoflange valve assembly according to an embodiment of the invention.
Figure 10:
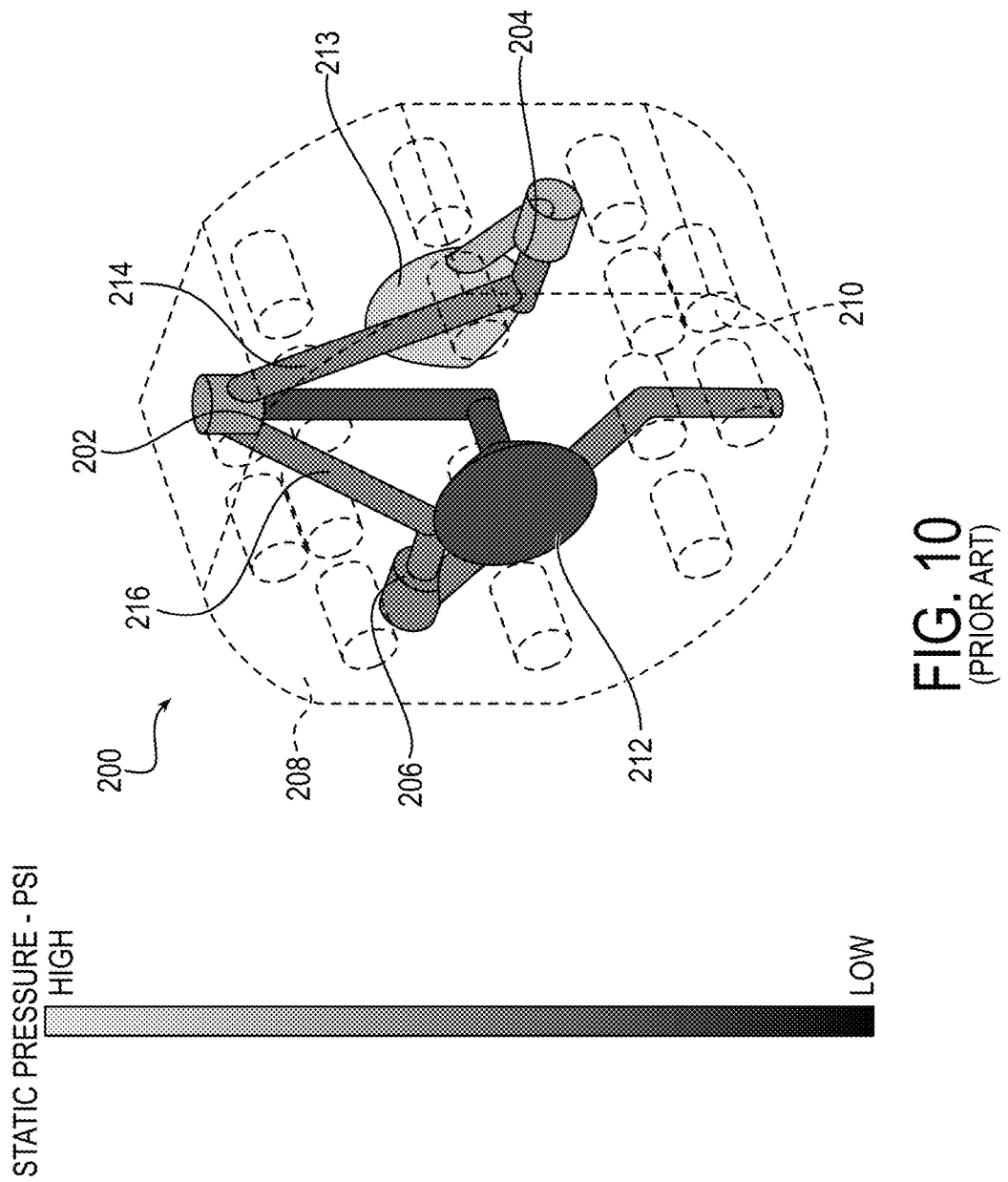
FIG. 10 is an exemplary computational fluid dynamic simulation of fluid flow characteristics through a prior art monoflange valve assembly.

Referring to FIGS. 9 and 10, a simulation of the fluid flow characteristics through the exemplary monoflange valve 10 (FIG. 9) compared to a simulation of the fluid flow characteristics of a conventional monoflange valve 200 (FIG. 10) are shown. As shown in FIG. 10, the conventional monoflange valve 200 has valve seats 202, 204, and 206 that are located close to the outer periphery of monoflange valve body 208. That is, the valve seats 202, 204, 206 are located radially outwardly of an imaginary annulus defined by radially inner sides of radially outer bolt holes 210. In the illustrated simulation, the valve seats 202, 204, 206 of the conventional monoflange valve 200 correlate to the valve seats 46, 48, and 50, respectively, of the exemplary monoflange valve 10, and the axial inlet passage 212 is located at the central region of the valve body 208. By locating the valve seats 202, 204, 206 close to the radially outer periphery of the valve body 208, the flow paths within the valve body are long and tortuous, which can reduce fluid flow characteristics and potentially cause clogging of certain processing fluids in the valve body. For example, as shown in the illustrated simulation of FIG. 10, the static pressure within intermediate passages 214, 216 is at a relatively elevated level compared to the static pressure at the inlet passage 212. The static pressure at the outlet passage 213 is also elevated compared to the static pressure at the inlet passage 212 and intermediate passages 214, 216.

In comparison, FIG. 9 shows an exemplary simulation of the fluid flow characteristics through the exemplary monoflange valve 10 of the present invention. As discussed above, the monoflange valve 10 has a main valve body portion 12 having valve seats 46, 48 located at a central region of the valve body 12 proximal a centrally located axial inlet passage 14. As shown in the illustrated simulation, the flow path from the inlet passage 14 to the outlet passage 16 is relatively short compared to the flow path in the conventional monoflange valve 200 (FIG. 10). In addition, the static pressure in the seat pocket chamber 84 and the intermediate passage 76 is relatively low compared to the static pressure at the inlet passage 14.

The comparative results of such flow simulations indicate that the exemplary monoflange valve 10 has up to about 70% higher Cv rating (less pressure drop across the choke under 1 gpm of flow) compared to the Cv rating of the conventional monoflange valve 200. In addition, the shorter flow path of the exemplary monoflange valve 10 may provide for a reduced axial thickness of the valve body 12 compared to the conventional design, which may result in the monoflange valve 10 being up to about 80% lighter than the prior art design.

Referring again to FIGS. 4-8, one or more of the valve assemblies 16, 18, 20 of the exemplary monoflange valve 10 may each include an attachment body, such as a sealing member, which may be used in severe service applications to reduce the potential for leakage of the processing fluid through the internal bores 40, 42, 44 to the outside environment.

Figure 8:
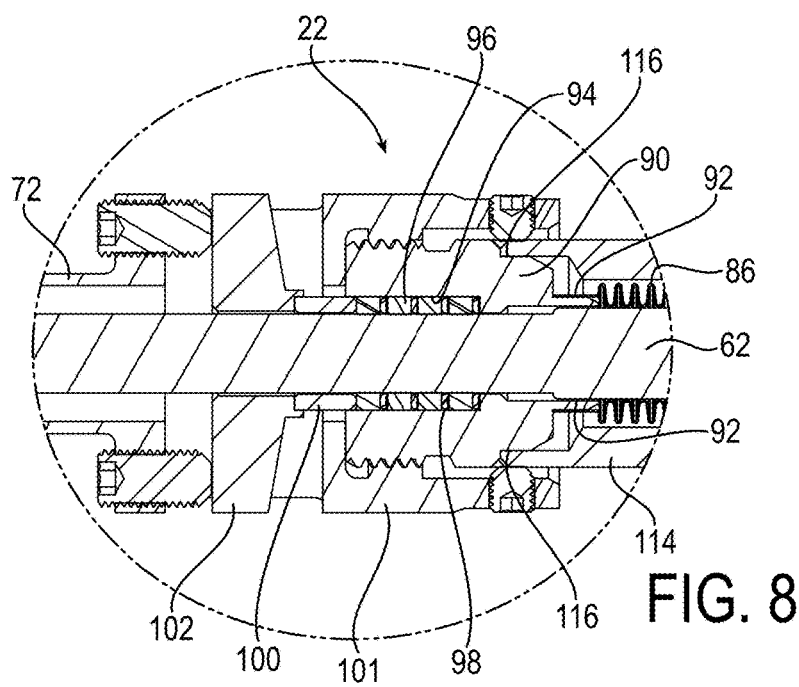
FIG. 8 is an enlarged view of a portion of the monoflange valve assembly in FIG. 4.

For example, as shown in FIG. 4 and the enlarged views of FIGS. 7 and 8, the sealing member of each valve assembly 16, 18, 20 may include a bellows 86 that is sealingly attached via welding to a radially inward portion of the respective valve stems 58, 60, 62 (shown at welding regions 88). The valve assemblies 18, 20, 22 also may include a bonnet 90 disposed at a radially outward portion of the valve body 12. The bellows 86 may have a radially outward portion that is sealingly attached via welding to the bonnet 90 (shown at welding regions 92). The bonnet 90 includes a bonnet internal bore 94, and the valve stem 62 may be movable in the bonnet internal bore relative to the bonnet 90 to allow the valve member 56 to open and close the flow path across the valve seat 46, 48, 50, as discussed above.

The respective valve assemblies 18, 20, 22 may further include a second seal member, or seal 96, such as a seal packing, which may include a Grafoil packed-seal, chevron-packed seal, O-ring packed seal, or other encapsulated pressure core seal, and which may be disposed within the bonnet internal bore 94 surrounding the valve stem 62. Such a seal 96 may provide a backup seal to the sealing member provided by the bellows 86 and bonnet 90. A plurality of seals 96 may be disposed within the bonnet internal bore 94 sandwiched between respective sealing rings 98. A radially outward packing ring 100 may cooperate with a bonnet cap 101 and a packing gland 102 to contain the seals 96 in the bonnet internal bore 94. The bonnet cap 101 may be threaded to an outer portion of the bonnet 90 and fixed in place with set screws. The packing gland 102 may be operatively coupled to the upper collar 72 of the actuator, which is operatively coupled to the handle 69 via nut 70.

In exemplary embodiments, the monoflange valve 10 includes one or more projections 110, 112, 114 that extend radially outwardly from the main valve body portion 12. As shown, the one or more projections 110, 112, 114 each correspond with the respective valve assemblies 18, 20, 22, and each projection 110, 112, 114 includes a radially outward portion of the internal bore 40, 42, 44 that extends through the valve body 12 to respective valve seats 46, 48, 50. In exemplary embodiments, the respective projections 110, 112, 114 are integral and unitary with the main valve body portion 12 so as to reduce the number of leakage paths through the valve body 12.

The bonnets 90 (or other sealing member) maybe sealingly attached to each of the projections 110, 112, 114 at locations spaced radially outwardly from the main valve body portion 12 (e.g., at regions 116 in the illustrated embodiment). As shown in the illustrated embodiment, the bonnets 90 may be welded to radially outward and portions of the respective projections 110, 112, 114. The radially outward portion of the bellows 86 is sealingly attached such as via welding to the bonnet 90, and the radially inward portion of the bellows 86 is sealingly attached to the valve stem (e.g., 58, 60, 62). In this manner, the bellows 86 extending across the internal bore (e.g., 40) from the valve stem (e.g., 58) to the bonnet 90 may seal the internal bore.

In exemplary embodiments, the bonnets 90 may be coupled to the projections 110, 112, 114 at locations sufficiently spaced from the valve body 12 to enable an automatic welding process to produce a consistent weld. Each of the projections 110, 112, 114 have an outer surface and an inner surface, defining a tubular wall therebetween, and the weld process may provide 100% weld penetration through the projection tubular wall. In an exemplary weld process, a groove may be cut into the tubular wall of the projection 110, 112, 114, and a first-pass penetration weld attaches the bonnet 90 to the projection. A second-pass filler weld may then provide 100% weld penetration through the full tubular wall thickness of the projection.

Welding the valve assembly attachment body, such as the sealing member (e.g., bonnet 90), to the respective projections 110, 112, 114 at locations spaced from the valve body 12 also offers an opportunity for the weldments to be fully inspected such as by radiographic testing. More particularly, the projection 110, 112, 114 may space the valve body 12 a sufficient distance from the weld location such that the mass of the valve body 12 does not obstruct the radiographic examination of the weld. In exemplary embodiments where a 2-inch diameter monoflange body is used, the bonnet 90 or other sealing member may be welded to the projection 110, 112, and 114 at a distance of about 0.25 inches to about 0.5 inches from the valve body 12.

Figure 11:
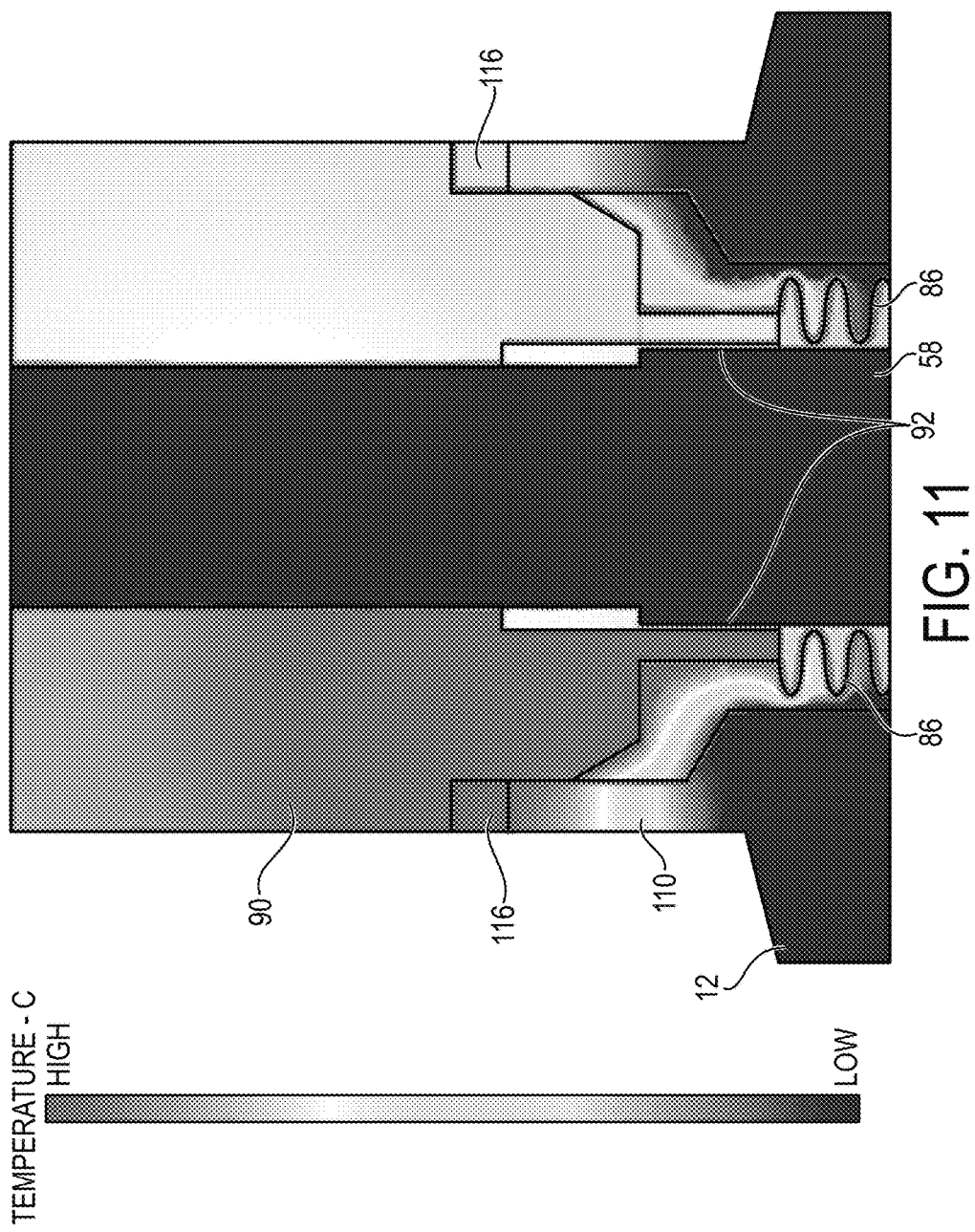
FIG. 11 is an exemplary simulation of temperature and heat transfer during welding of a sealing member to an exemplary projection of the exemplary monoflange valve assembly according to an embodiment of the invention.

Providing the projections 110, 112, 114 extending radially outward from the valve body 12 and welding the bellows 90 or other sealing member at a location sufficiently spaced from the valve body 12 also may enable improved heat transfer away from the welded area (heat affected zone). For example, such a configuration may enable heat transfer from the welding to be more uniform and the heat generated from the weld may be limited to a temperature that is less than the annealing point of the bellows or other sealing material. For example, FIG. 11 shows an exemplary simulation of temperatures and heat transfer during an exemplary welding operation in which the bonnet 90 is welded to the projection 110 at region 116 on the left side in the illustration. As shown in the illustrated simulation, by welding the bonnet 90 to the projection 110 at the location 116 spaced from the valve body 12, the peak temperature that reaches the bellows 86 is less than half the annealing temperature of the bellows material temperature.

Figures 12, 13:
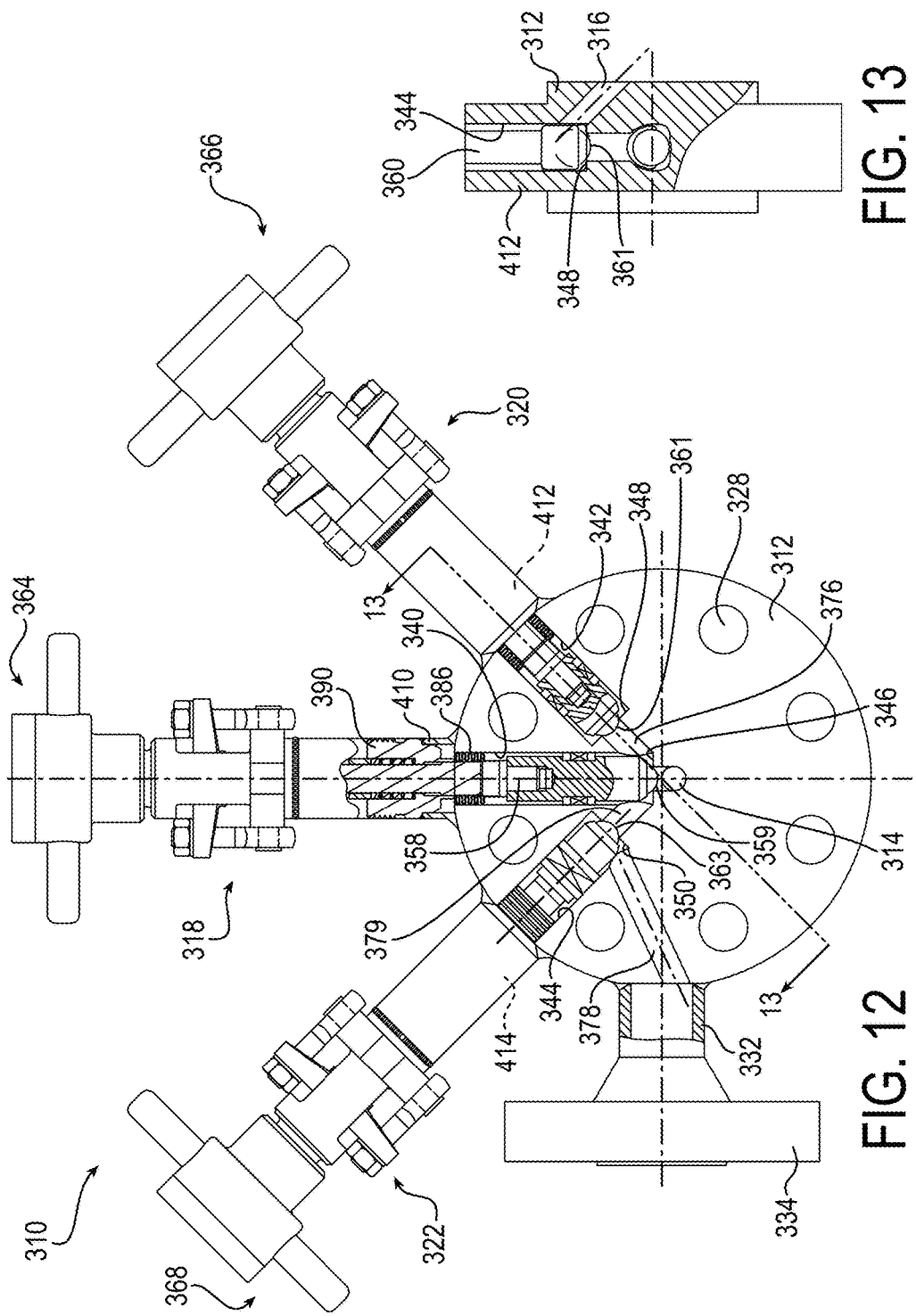
FIG. 12 is a cross-sectional view of another exemplary monoflange valve assembly according to an embodiment of the invention.
FIG. 13 is a side cross-sectional view of the monoflange valve assembly taken along the line 13-13 in FIG. 12.

Turning to FIGS. 12 and 13, another exemplary embodiment of a monoflange valve assembly 310 is shown. The monoflange valve assembly 310 is substantially the same as the above-referenced monoflange valve assembly 10, and consequently the same reference numerals but indexed by 300 are used to denote structures corresponding to similar structures in the monoflange valve assemblies 10, 310. In addition, the foregoing description of the monoflange valve assembly 10 is equally applicable to the monoflange valve assembly 310 except as noted below. Moreover, it is understood that aspects of the monoflange valve assemblies 10, 310 may be substituted for one another or used in conjunction with one another where applicable.

The monoflange valve assembly 310 includes a main monoflange body 312, or valve body, having an axial inlet fluid passage 314 disposed at a central region of the monoflange body 312, an outlet fluid passage 316 fluidly connected to the axial inlet fluid passage 314, and internal bores 340, 342, 344 extending radially inwardly from a radially outer periphery of the monoflange body 312 to respective valve seats 346, 348, 350. The monoflange valve 310 also includes a first valve assembly 318 (e.g., primary block), a second valve assembly 320 (e.g., secondary block), and a third valve assembly 322 (e.g., bleed) having respective valve members disposed in the respective internal bores 340, 342, 344. The valve members include respective valve stems 358, 360, 362 and sealing surfaces 359, 361, 363 (shown in a ball-type configuration) for engaging the respective valve seats 346, 348, 350. The valve assemblies 318, 320, 322 also include respective actuators 364, 366, 368 for moving the respective valve stems 358, 360, 362 and sealing surfaces 359, 361, 363 in the respective internal bores between a closed position in which the respective sealing surfaces engage the respective valve seats to close a flow path across the valve seats, and an open position in which the respective sealing surfaces disengage from the respective valve seats to open the flow path between across the valve seats. In comparison to the exemplary monoflange valve assembly 10 which has the second valve assembly 20 and the third valve assembly 22 arranged at about 90-degrees relative to the first valve assembly 18 (e.g., a "T-shaped" configuration), the exemplary monoflange valve assembly 310 has the second valve assembly 320 and the third valve assembly 322 arranged at acute angles relative to the first valve assembly 318 (e.g., a "W-shaped" configuration).

As shown in the illustrated embodiment in FIGS. 12 and 13, the first valve seat 346 that cooperates with the first valve member 318 is disposed at the central region of the monoflange body 312 between the inlet fluid passage 314 and the outlet fluid passage 316 to enhance fluid flow through the monoflange body 312. As shown, the second valve seat 348 is also disposed at the central region of the monoflange body 312 between the inlet fluid passage 314 and the outlet fluid passage 316, where the second valve seat 348 is downstream of the first valve seat 346 via intermediate passage 376. Also as shown, the third valve seat 350 is disposed at the central region of the monoflange body 312 between the inlet passage 314 and bleed passage 378, where the third valve seat 350 is downstream of the first valve seat 348 via second intermediate passage 379. The centrally located valve seats 346, 348, 350 may be located proximal the inlet passage 314, or may be located closer to the center of the valve body 312 than a radially outer periphery of the valve body 312, or may be located radially inwardly of an imaginary annuls defined by radially inward edges of bolt holes 318. The monoflange valve 310 may further a flange member having a neck 332 extending radially outwardly from the valve body 312 and a flange 334 disposed at a radially outward end portion of the neck 332. The neck 332 may be fluidly connected to the bleed fluid passage 378.

The monoflange valve assembly 310 also may include one or more projections 410, 412, 414 extending radially outwardly from the main body portion 312. The respective projections 410, 412, 414 include a radially outward portion of the respective internal bores 340, 342, 344, and the respective valve assemblies 318, 320, 322 may each include an attachment body welded to the respective projections 410, 412, 414 at respective locations spaced radially outwardly from the main body portion 312, thereby facilitating welding and/or inspection of the weldment. The respective attachment bodies may include one or more sealing members. For example, the respective valve assemblies 318, 320, 322 may each include a bonnet 390 welded to the projection at locations spaced radially outwardly from the main body portion 312. A bellows 386 may be sealingly attached to the bonnet 390 at a radially outward portion of the bellows, and the bellows 386 may be sealingly attached to the valve stem 358, 360, 362 at a radially inward portion of the bellows 386.

Such a configuration of the monoflange valve assembly 310 may enable it to reduce or eliminate leakage of processing fluid out of the valve body 312 for use in severe service applications.

Turning to FIGS. 14 and 15, another exemplary embodiment of a monoflange valve assembly 510 is shown. The monoflange valve assembly 510 is similar to the above-referenced monoflange valve assembly 10, and consequently the same reference numerals but indexed by 500 are used to denote structures corresponding to similar structures in the monoflange valve assemblies 10, 510. In addition, the foregoing description of the monoflange valve assembly 10 is equally applicable to the monoflange valve assembly 510 except as noted below. Moreover, it is understood that aspects of the monoflange valve assemblies 10, 510 may be substituted for one another or used in conjunction with one another where applicable.

The monoflange valve assembly 510 includes a main monoflange body 512, or valve body, having an axial inlet fluid passage 514 disposed at a central region of the monoflange body 512, an outlet fluid passage 516 fluidly connected to the axial inlet fluid passage 514, and internal bores 540, 542, 544 extending radially inwardly from a radially outer periphery of the monoflange body 512 to respective valve seats 546, 548, 550. The monoflange valve 510 also includes a first valve assembly 518 (e.g., primary block), a second valve assembly 520 (e.g., secondary block), and a third valve assembly 522 (e.g., bleed) having respective valve members disposed in the respective internal bores 540, 542, 544. The valve members include respective valve stems 558, 560, 562 and sealing surfaces 559, 561, 563 (shown in a ball-type configuration) for engaging the respective valve seats 546, 548, 550. The valve assemblies 518, 520, 522 also include respective actuators 564, 566, 568 for moving the respective valve stems 558, 560, 562 and sealing surfaces 559, 561, 563 in the respective internal bores between a closed position in which the respective sealing surfaces engage the respective valve seats to close a flow path across the valve seats, and an open position in which the respective sealing surfaces disengage from the respective valve seats to open the flow path between across the valve seats. Similar to the monoflange valve assembly 310, the monoflange valve assembly 510 has the second valve assembly 520 and the third valve assembly 522 arranged at acute angles relative to the first valve assembly 518 (e.g., a "W-shaped" configuration).

As shown in the illustrated embodiment in FIGS. 14 and 15, the first valve seat 546 that cooperates with the first valve member 518 is disposed at the central region of the monoflange body 512 between the inlet fluid passage 514 and the outlet fluid passage 516 to enhance fluid flow through the monoflange body 512. As shown, the second valve seat 548 is also disposed at the central region of the monoflange body 512 between the inlet fluid passage 514 and the outlet fluid passage 516, where the second valve seat 548 is downstream of the first valve seat 546 via an intermediate passage. Also as shown, the third valve seat 550 is disposed at the central region of the monoflange body 512 between the inlet passage 514 and a bleed passage 578, where the third valve seat 550 is downstream of the first valve seat 548 via a second intermediate passage. The centrally located valve seats 546, 548, 550 may be located proximal the inlet passage 514, or may be located closer to the center of the valve body 512 than a radially outer periphery of the valve body 512, or may be located radially inwardly of an imaginary annuls defined by radially inward edges of bolt holes 518.

In comparison to the exemplary monoflange valve assemblies 10, 310 which have projections (e.g., 110, 410) extending from the valve bodies 12, 312, the exemplary monoflange valve assembly 510 does not have such projections. The respective valve assemblies 518, 520, 522 of the monoflange valve assembly 510 also do not include a bellows welded to the valve body 512. Instead, the respective valve assemblies 518, 520, 522 include regular valve packing as sealing members, and may be coupled to the valve body 512, such as by threading. Such a configuration of the monoflange valve assembly 510 may provide a less expensive alternative to the monoflange valve assemblies 10, 310 for use in non-severe service applications, while still enhancing fluid flow characteristics through the valve body by centrally locating the valve seat(s) and/or shortening the fluid flow path through the valve body.

The exemplary monoflange valve described herein provides a relatively short flow path through the valve body, which may enhance fluid flow, thereby reducing problems associated with certain process fluids, for example, to reduce the tendency of clogging. More particularly, the exemplary monoflange valve may have a valve member for cooperating with a valve seat located at or near the center of the valve body and/or inlet fluid passage for reducing the length and/or tortuosity of the flow path. Such a configuration also may provide sufficient mass around the valve seat to accommodate a valve body with reduced size and weight compared to known monoflange valves.

Such a configuration also may enhance valve performance in a compact design profile. For example, in exemplary embodiments the valve assembly may include a sealing member such as a bellows, which may be sealingly attached at radially inward and outward end portions. The unique length of the bellows/stem assembly may offer a greater stroke to fully open a bigger bore, and also may provide for a choke location adjacent the inlet and outlet of the process commodity. In this manner, by providing a straight and long passage for the bellows seal valve assembly, more room may be provided for the bellows seal valve assembly to accommodate a larger bore in a more compact design profile, which reduces the overall size of the exemplary valve and manifold assembly. As such, the entire bellows/stem assembly can be located in the valve body radially inwardly of the bolt pattern, which may allow the valve body to provide the necessary thickness to withstand high pressures.

The exemplary monoflange valve assembly described herein may include projections extending radially outwardly from the valve body, which may provide enough room for an automatic weldment process to produce a consistent weld with 100% full penetration of the weldment through the transverse thickness of the projection at the joint connection. In addition, coupling the bellows seal valve assemblies to the projections at such locations spaced from the valve body via welding also offers an opportunity for the welds to be fully radiographed and inspected. For example, the valve body may be spaced a sufficient distance from the weld location such that the mass of the body does not obstruct the radiographic examination of the weld. In addition, by providing the projections and welding the bellows seal valve assemblies at locations sufficiently spaced from the valve body, heat transfer away from the welded area (heat affected zone) may be improved. For example, heat transfer may be more uniform and the heat generated from the weld may be limited to less than the annealing point of the bellows material.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A monoflange valve assembly comprising:
   a monoflange body having:
      an axial inlet fluid passage disposed at a central region of the monoflange body,
      an outlet fluid passage fluidly connected to the axial inlet fluid passage, and
      an internal bore extending radially inwardly from a radially outer periphery of the monoflange body to a valve seat; and
   a valve assembly having a valve member disposed in the internal bore, the valve member having a sealing surface for engaging the valve seat;
   wherein the valve member is movable in the internal bore between a closed position in which the sealing surface engages the valve seat to close a flow path between the inlet fluid passage and the outlet fluid passage, and an open position in which the sealing surface disengages from the valve seat to open the flow path between the inlet fluid passage and the outlet fluid passage; and
   wherein the valve seat is disposed at the central region of the monoflange body between the inlet fluid passage and the outlet fluid passage to enhance fluid flow through the monoflange body.

2. The monoflange valve assembly according to claim 1, wherein the valve seat is located closer to a central axis of the monoflange body than the radially outer periphery of the monoflange body.

3. The monoflange valve assembly according to claim 1, wherein the monoflange body has bolt holes for coupling the monoflange valve assembly to a main fluid conduit; and
   wherein the valve seat is located radially inwardly of an imaginary annulus defined by radially inner sides of the bolt holes.

4. The monoflange valve assembly according to claim 1, wherein the valve assembly includes a bellows, the bellows having a radially inward portion sealingly attached to a radially inward portion of the valve member.

5. The monoflange valve assembly according to claim 4, wherein the valve assembly includes a bonnet attached to a radially outward portion of the monoflange body; and
   wherein the bellows has a radially outward portion sealingly attached to the bonnet.

6. The monoflange valve assembly according to claim 5, wherein the monoflange body has a main body portion and a projection extending radially outwardly from the main body portion;
   wherein the internal bore of the monoflange body extends radially inwardly through the projection and the main body portion; and
   wherein the bonnet is welded to the projection at a location spaced radially outwardly from the main body portion.

7. The monoflange valve assembly according to claim 5, wherein the bonnet includes a bonnet internal bore, and the valve member is movable in the bonnet internal bore relative to the bonnet;
   wherein the valve member has a radially outward end portion that extends radially outwardly beyond the bonnet; and
   wherein the valve assembly further includes an actuator operably coupled to the radially outward end portion of the valve member for moving the valve member between the open position and the closed position.

8. The monoflange valve assembly according to claim 1, further having a second internal bore extending radially inwardly from the radially outer periphery of the monoflange body to a second valve seat; and
   a second valve assembly having a second valve member disposed in the second internal bore, the second valve member having a second sealing surface for engaging the second valve seat;
   wherein the second valve member is movable in the second internal bore between a closed position in which the second sealing surface engages the second valve seat to close a flow path between the inlet fluid passage and the outlet fluid passage, and an open position in which the second sealing surface disengages from the second valve seat to open the flow path between the inlet fluid passage and the outlet fluid passage; and
   wherein the second valve seat is disposed at the central region of the monoflange body between the inlet fluid passage and the outlet fluid passage.

9. The monoflange valve assembly according to claim 8, wherein the valve seat is a first valve seat, and wherein the second valve seat is disposed in the fluid flow path downstream of the first valve seat; and
   wherein the monoflange body has an intermediate passage fluidly connected between the first valve seat and the second valve seat.

10. The monoflange valve assembly according to claim 1, wherein:
    the internal bore, the valve seat, the valve assembly, the valve member, and the sealing surface are respectively a first internal bore, a first valve seat, a first valve assembly, and a first valve member;
    the monoflange body has a main body portion and a first projection extending radially outwardly from the main body portion;
    the first valve assembly includes a first bonnet and a first bellows;
    the first bellows has a radially inward portion sealingly attached to a radially inward portion of the first valve member, and the first bellows has a radially outward portion sealingly attached to the first bonnet; and
    the first bonnet is welded to the first projection at a location spaced radially outwardly from the main body portion;
    wherein the monoflange valve assembly further includes:
    a second internal bore extending radially inwardly from the radially outer periphery of the monoflange body to a second valve seat; and a second valve assembly having a second valve member disposed in the second internal bore, the second valve member having a second sealing surface for engaging the second valve seat;

wherein the second valve member is movable in the second internal bore between a closed position in which the second sealing surface engages the second valve seat to close a flow path between the inlet fluid passage and the outlet fluid passage, and an open position in which the second sealing surface disengages from the second valve seat to open the flow path between the inlet fluid passage and the outlet fluid passage;

wherein the second valve seat is disposed at the central region of the monoflange body between the inlet fluid passage and the outlet fluid passage;

wherein the monoflange body further includes a second projection extending radially outwardly from the main body portion;

wherein the second valve assembly includes a second bonnet and a second bellows;

wherein the second bellows has a radially inward portion sealingly attached to a radially inward portion of the second valve member, and the second bellows has a radially outward portion sealingly attached to the second bonnet; and wherein the second bonnet is welded to the second projection at a location spaced radially outwardly from the main body portion.

11. The monoflange valve assembly according to claim 1, wherein the internal bore, the valve seat, the valve assembly, the valve member, and the sealing surface are respectively a first internal bore, a first valve seat, a first valve assembly, and a first valve member;

the monoflange valve assembly further having a bleed fluid passage and a second internal bore extending radially inwardly from the radially outer periphery of the monoflange body to a second valve seat; and a second valve assembly having a second valve member disposed in the second internal bore, the second valve member having a second sealing surface for engaging the second valve seat;

wherein the second valve member is movable in the second internal bore between a closed position in which the second sealing surface engages the second valve seat to close a flow path between the inlet fluid passage and the bleed fluid passage, and an open position in which the second sealing surface disengages from the second valve seat to open the flow path between the inlet fluid passage and the bleed fluid passage; and wherein the second valve seat is disposed at the central region of the monoflange body between the inlet fluid passage and the bleed fluid passage.

12. The monoflange valve assembly according to claim 11, wherein the second valve seat is disposed in the fluid flow path downstream of the first valve seat and upstream of the bleed fluid passage; and wherein the monoflange body has an intermediate passage fluidly connected between the first valve seat and the second valve seat.

13. The monoflange valve assembly according to claim 1, wherein:

the internal bore, the valve seat, the valve assembly, the valve member, and the sealing surface are respectively a first internal bore, a first valve seat, a first valve assembly, and a first valve member;

the monoflange body has a main body portion and a first projection extending radially outwardly from the main body portion;

the first valve assembly includes a first bonnet and a first bellows;

the first bellows has a radially inward portion sealingly attached to a radially inward portion of the first valve member, and the first bellows has a radially outward portion sealingly attached to the first bonnet; and the first bonnet is welded to the first projection at a location spaced radially outwardly from the main body portion;

wherein the monoflange valve assembly further includes:

a second internal bore extending radially inwardly from the radially outer periphery of the monoflange body to a second valve seat; and a second valve assembly having a second valve member disposed in the second internal bore, the second valve member having a second sealing surface for engaging the second valve seat;

wherein the second valve member is movable in the second internal bore between a closed position in which the second sealing surface engages the second valve seat to close a flow path between the inlet fluid passage and the outlet fluid passage, and an open position in which the second sealing surface disengages from the second valve seat to open the flow path between the inlet fluid passage and the outlet fluid passage;

wherein the second valve seat is disposed at the central region of the monoflange body between the inlet fluid passage and the outlet fluid passage;

wherein the monoflange body has an intermediate passage fluidly connected between the first valve seat and the second valve seat;

wherein the monoflange body further includes a second projection extending radially outwardly from the main body portion;

wherein the second valve assembly includes a second bonnet and a second bellows;

wherein the second bellows has a radially inward portion sealingly attached to a radially inward portion of the second valve member, and the second bellows has a radially outward portion sealingly attached to the second bonnet; and wherein the second bonnet is welded to the second projection at a location spaced radially outwardly from the main body portion;

wherein the monoflange valve assembly further includes:

a bleed fluid passage and a third internal bore extending radially inwardly from the radially outer periphery of the monoflange body to a third valve seat; and a third valve assembly having a third valve member disposed in the third internal bore, the third valve member having a third sealing surface for engaging the third valve seat;

wherein the third valve member is movable in the third internal bore between a closed position in which the third sealing surface engages the third valve seat to close a flow path between the inlet fluid passage and the bleed fluid passage, and an open position in which the third sealing surface disengages from the third valve seat to open the flow path between the inlet fluid passage and the bleed fluid passage; and wherein the third valve seat is disposed at the central region of the monoflange body between the inlet fluid passage and the bleed fluid passage;

wherein the monoflange body has an intermediate passage fluidly connected between the first valve seat and the third valve seat;

wherein the monoflange body further includes a third projection extending radially outwardly from the main body portion;

wherein the third valve assembly includes a third bonnet and a third bellows;

wherein the third bellows has a radially inward portion attached to a radially inward portion of the third valve member, and the third bellows has a radially outward portion attached to the third bonnet; and wherein the third bonnet is welded to the third projection at a location spaced radially outwardly from the main body portion.

14. The monoflange valve assembly according to claim 11, wherein the monoflange body has a main body portion and a flange member having a neck welded to the main body portion, the flange member having a flange disposed at a radially outer portion of the neck; and wherein the neck includes the bleed fluid passage fluidly connected to a bleed outlet.

15. A monoflange valve assembly comprising:

a monoflange body having an axial inlet fluid passage, an outlet fluid passage fluidly connected to the axial inlet fluid passage, and a plurality of internal bores each extending radially inwardly from a radially outward periphery of the monoflange body; and a plurality of valve assemblies each having a valve member disposed in the respective internal bores, the respective valve members each have a sealing surface configured to cooperate with corresponding valve seats disposed at radially inward end portions of the respective internal bores;

wherein the valve seats are annularly arranged around a periphery of a common internal seat pocket chamber and define respective sides of the internal seat pocket chamber.

16. A monoflange valve assembly comprising:

a monoflange body having a main body portion, the main body portion having an axial fluid passage for communication with a fluid stream;

a projection extending radially outwardly from the main body portion, the projection having an internal bore that extends radially inwardly through the projection and connects with the axial fluid passage of the main body portion; and a valve assembly having an attachment body welded to the projection at a location spaced radially outwardly from the main body portion, thereby facilitating welding and/or inspection of the weldment.

17. The monoflange valve assembly according to claim 16, wherein the projection is integral and unitary with the main body portion.

18. The monoflange valve assembly according to claim 16, wherein the attachment body includes a bonnet, the valve assembly further including a valve member and a bellows;

wherein the valve member is disposed within the internal bore and is configured to engage a corresponding valve seat disposed at a radially inward end portion of the internal bore, the valve member being movable in the internal bore between a closed position in which the sealing surface engages the valve seat to close a flow path through the axial fluid passage, and an open position in which the sealing surface disengages from the valve seat to open the flow path through the axial fluid passage; and wherein the bellows has a radially inward portion sealingly attached to a radially inward portion of the valve member, and the bellows has a radially outward portion sealingly attached to the bonnet.

19. The monoflange valve assembly according to claim 18, wherein the bonnet includes a bonnet internal bore, and the valve member is movable in the bonnet internal bore relative to the bonnet; and wherein a seal packing is disposed within the bonnet internal bore and surrounds the valve member.

20. The monoflange valve assembly according to claim 16, wherein the projection has an outer surface and an inner surface, the inner surface defining a portion of the internal bore;

wherein a transverse distance between the inner surface and the outer surface defines a tubular wall, the tubular wall having a transverse thickness that enables full penetration of the weldment through the entire transverse thickness of the tubular wall when the attachment body of the valve assembly is welded to the projection.

* * * * *